July 16, 1963

C. W. GERSTER ETAL 3,097,411

APPARATUS FOR SHAPING PRESSURE-SHAPABLE MATERIALS

Filed Feb. 13, 1961

INVENTORS
Charles W. Gerster + Howard Pearch
BY
Attorney

July 16, 1963 C. W. GERSTER ETAL 3,097,411
APPARATUS FOR SHAPING PRESSURE-SHAPABLE MATERIALS
Filed Feb. 13, 1961 4 Sheets-Sheet 3

INVENTOR.
Charles W. Gerster + Howard Pearch
BY Milton L. Simmons

Attorney

United States Patent Office 3,097,411
Patented July 16, 1963

3,097,411
APPARATUS FOR SHAPING PRESSURE-
SHAPABLE MATERIALS
Charles W. Gerster, East Liverpool, Ohio, and Howard Pearch, Paramount, Calif., assignors to Ferro Corporation, Cleveland, Ohio
Filed Feb. 13, 1961, Ser. No. 93,284
5 Claims. (Cl. 25—45)

This invention deals generally with an apparatus for pressing and shaping pressure-formable materials, and more particularly to a method and apparatus for dry pressing ceramic shapes.

Apparatus for dry pressing relatively flat ceramic pieces such as ceramic tile have been known for quite some time. The classic method is to charge the ceramic, dry-press material into a rectangular cavity having a bottom, and side walls in the form of a case, the bottom of said cavity forming a bottom die, driving an upper die forcefully into said cavity thus shaping the dry-press material in said cavity into the general dimensions of the interior of said cavity, withdrawing the upper die, moving the side walls downwardly with respect to the lower die thus completely exposing the pressed article except for its contact with said bottom die, and removing the shaped article from contact with the bottom die. The shaped article was then fired to the desired degree of vitrification in a suitable kiln.

However, for pressing relatively flat pieces having flanges or projections at right angles to the generally flat plane of the web of the pieces, as for example found in certain types of kiln furniture such as tile setter bases, it was extremely difficult to achieve an equal radio of compression reduction in all cross sectional dimensions of the finished piece. That is, filling the die cavity flush with the upper, flat surface of the case, the lower die within said case having the necessary grooves and ridges to form generally vertical flanges in the shaped article, entry of the upper, generally flat, die into the cavity would obviously not produce an equal degree of compression throughout the finished piece. The relatively thin web sections would be highly compressed, whereas the vertically thicker flanges and vertical ridges would be less dense, hence more porous which resulted in points of weakness and delamination in the green shaped article and in the finished fired piece giving it a much shorter service life.

Furthermore, the old three-piece forming cavity comprising a top and bottom die, and a case surrounding the lower die movable independently of the lower die, and forming the vertical side walls of the piece to be pressed, made it extremely difficult to quickly remove flanged pieces from the lower die, when said lower die had been suitably machined to cause the formation of certain flanges, or other projections which, after the ceramic shape had been pressed, were embedded in the lower face and had to be removed slowly and carefully in order to avoid breakage of the projections.

It is therefore an object of this invention to provide an apparatus for dry pressing ceramic shapes of variable cross section.

It is a further object of this invention to provide a dry pressed ceramic article of variable cross section, all parts of which have undergone substantially the same degree of compression during the forming operation.

It is a further object of this invention to provide a dry pressed ceramic article of uniform density.

It is also an object of this invention to provide an apparatus for the production of a dry pressed ceramic article of uniform density.

It is further an object of this invention to provide an apparatus for dry pressing ceramic articles of variable cross section which permits their rapid and easy removal from the means for forming them.

Further objects and advantages of the present invention will be apparent from the following description, reference being had to the accompanying drawings wherein a preferred form of embodiment of the invention is clearly shown.

Figures 2, 7:
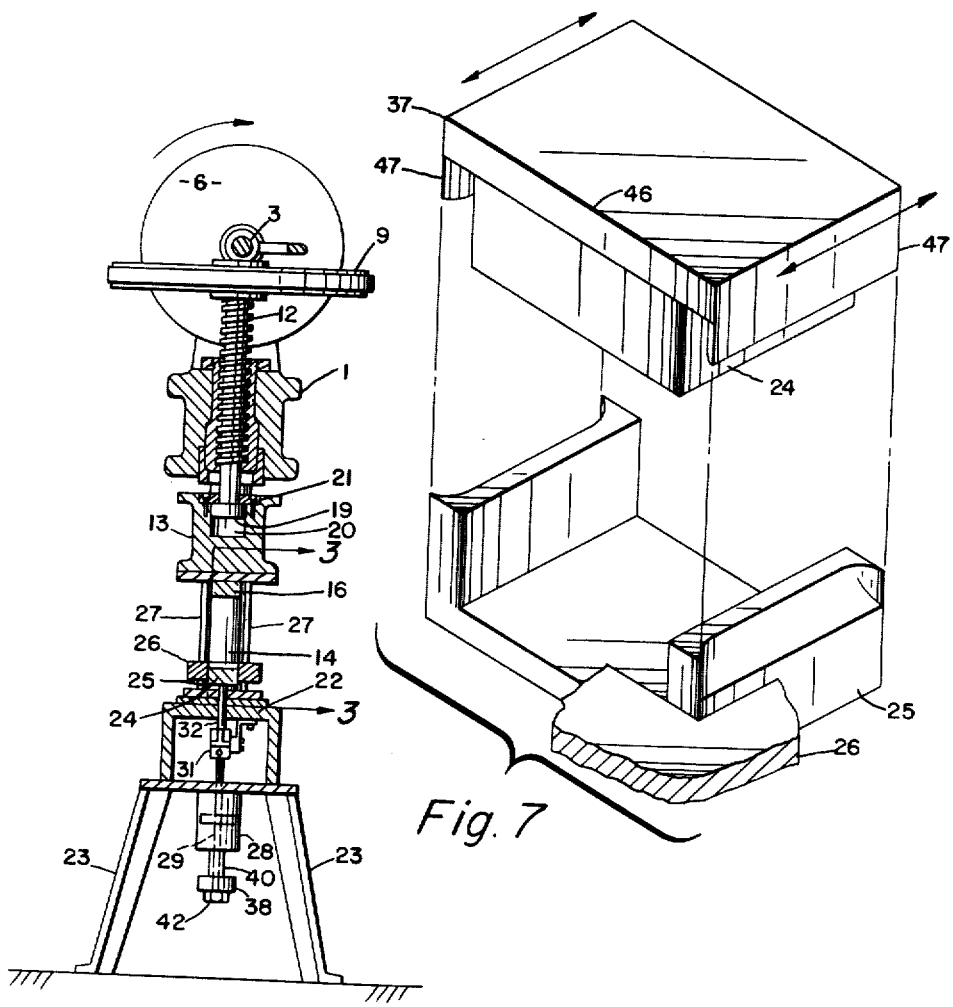
FIG. 2 is a transverse vertical sectional view taken on the line 2—2 of FIG. 1.
Figure 3:
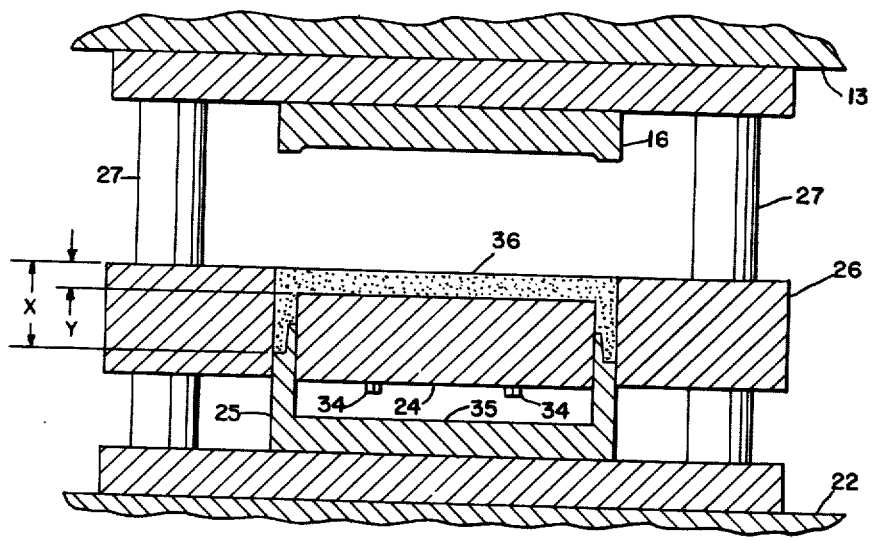
FIG. 3 is a section taken through the line 3—3 of FIG. 2 showing the relative position of the die components prior to pressing with the forming cavity filled with raw material struck flush with the flat, upper surface of the case.
Figure 6:
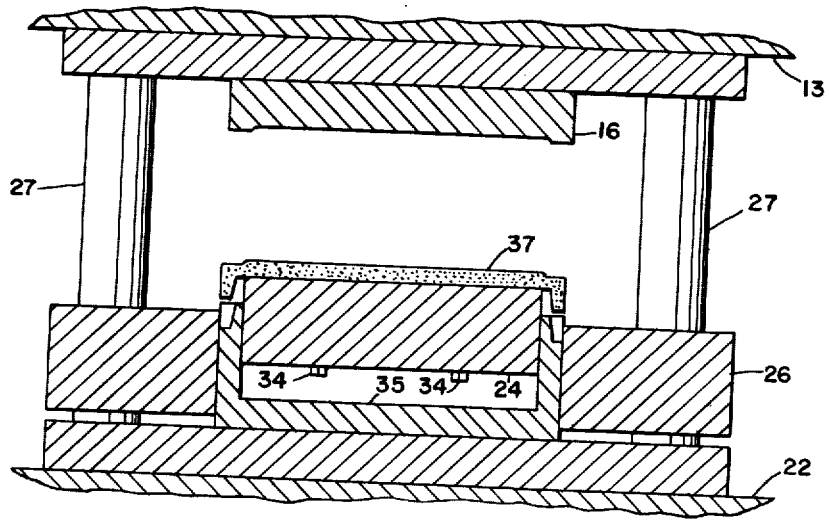

FIG. 6 is a sectional sequential view of the parts depicted in FIG. 3, showing the side walls in their lower-most position, the plunger die member in its upper-most position, and a segment of the cavity die member elevated to its maximum height, with vertical flanges of the pressed, shaped article free and clear of contact with the side walls, plunger die member and stationary segment of the cavity die member;

FIG. 7 is an exploded perspective view of the segments of the cavity die member, and the pressure shaped article, the arrows indicating the direction of movement for slidably removing the finished article from the elevated segment of the lower die, with the side walls, in the form of a case, in their depressed position.

Figure 1:
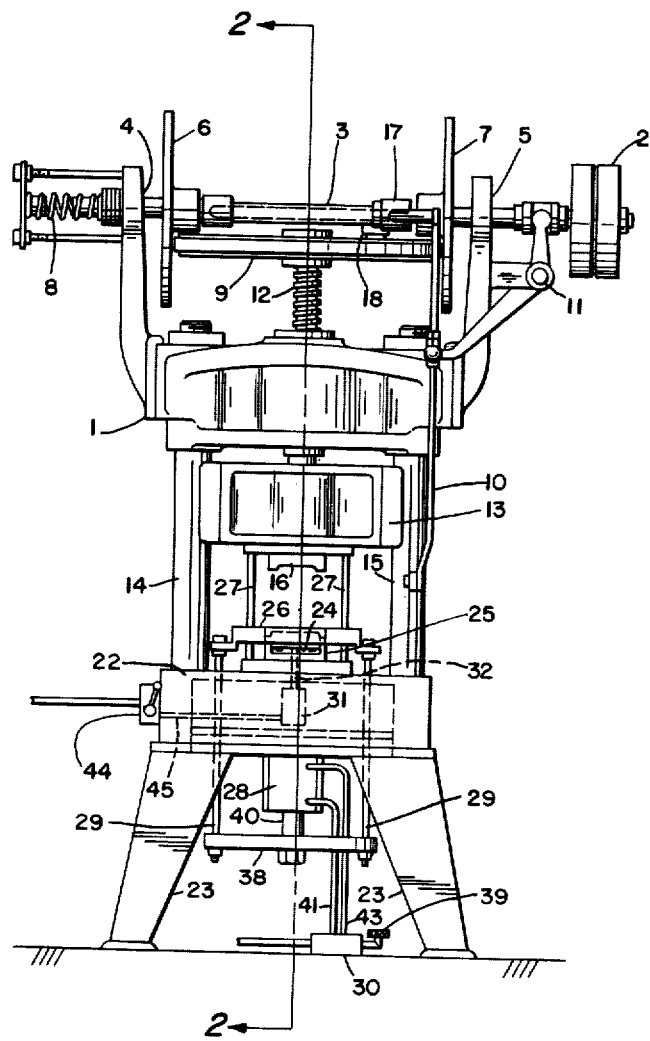
FIG. 1 is a front elevation of a press embodying our novel invention.

Referring now more particularly to the drawings, FIGS. 1 and 2, the apparatus is indicated generally by the numeral 1.

Although our invention deals primarily with the cavity die member and its function, the upper section of the press, which is of conventional design and well known to those skilled in the art, shall be described briefly before proceeding to the novel features of this invention.

The belt pulley 2, firmly fixed to drive shaft 3, journaled at points 4 and 5 in the framework of the press 1, is constantly rotated by an endless belt connected to a source of power not shown, so that the circular driving discs 6 and 7, also fixed to shaft 3, are continuously rotated thereby in a clockwise direction when viewed through the section 2—2, as shown in FIG. 2.

A spring 8 is adjustable to maintain the shaft mounted rotating discs 6 and 7 in a position such that they are just out of contact wtih the friction wheel 9. Rotating discs 6 and 7 are separated on shaft 3 by a distance greater than the diameter of friction wheel 9.

Thus, an operator exerting tension on the toggle arm 10 transmits a force along the direction of shaft 3, through fulcrum 11, so as to force the rotating disc 7 into frictional contact with the friction wheel 9.

Friction wheel 9 is firmly fixed to one end of screw 12 which in turn is rotatably threaded through the top stationary cross member of the press 1.

Screw 12 is in turn rotatably mounted in cross head 13 positioned to slide vertically up or down between spaced uprights 14 and 15.

Thus, when disc 7 imparts a spinning motion to friction wheel 9, the entire assembly which comprises the friction wheel 9, screw 12 and cross head 13, to which is firmly fixed plunger die member 16, are rapidly and forcefully moved downwardly, forcing the plunger die member 16 into the forming cavity supported below on the bed 22 of the press. Plunger die member 16 provides one of the article shaping surfaces, or faces, of the closed forming cavity.

After the ceramic piece is shaped, the toggle 10 is pushed upwardly, and through fulcrum 11, moves the shaft 3 in the opposite direction (toward the right viewing the shaft 3 in FIG. 1) so as to bring the rotating disc 6 in contact with friction wheel 9, at the same time removing rotating disc 7 from frictional contact therewith. Disc 6 imparts a spin to the friction wheel 9 in the opposite direction which elevates the entire assembly comprising friction wheel 9, screw 12 and cross head 13, pulling plunger die member 16 out of contact with the formed ceramic article. The upper movement of toggle 10 also rotates the sleeve 17 slightly, forcing a cushioned breaking surface 18 into contact with the top of friction wheel 9 so as to diminish its speed of rotation and absorb some of the shock on the press frame by minimizing jarring contact between the upward moving cross head 13 and the frame.

Referring to FIG. 2, it will be seen that means have been provided by which the screw 12 can move independently of the cross head 13 carrying the plunger die member 16, far enough to withdraw upwardly after the first blow and descend again with a second blow. It will be seen that the screw 12 is provided with an enlarged head 19 which lies in a cylindrical socket 20 in the cross head 13 and is held against withdrawal by a keeper plate 21, forming a swivel connection. The head 19 thus has a limited movement independent of the cross head 13, and for a second, or subsequent blow into the forming cavity, the screw 12 is withdrawn for not more than its limited distance and then brought down again against the bottom of the socket 20. This enables a second, or subsequent blow, to be struck without breaking the "seal" formed by the plunger die member in the forming cavity, and yet said plunger die member can be moved into and out of the forming cavity below, when desired, as usual. Thus it can be seen that, by utilizing the toggle 10, an operator can with one hand cause the plunger die member 16 to forcefully descend into a forming cavity positioned below, strike said plunger die member repeated blows without breaking the "seal," and then elevate the plunger die member out of the forming cavity by lifting upwardly on the toggle 10.

To those skilled in the art, the dry-press process, and the shapable material used in conjunction therewith, are well known, and practically any combination of ceramic materials, such as clay, quartz, feldspar, grog, etc., of varying mesh size may be utilized, so long as they meet the general requirements of their intended application as to moisture content, degree of green strength under any given forming pressure, etc. Generally, the dry-pressed material used in this invention has the consistency of a damp, somewhat granular powder, containing seven to ten percent water. However, the essence of this invention is not dependent upon the type of shapable material used, so long as it can be fed into a forming cavity, and will tend to hold its pressed shape after pressure is released.

Proceeding now to the novel features of our press, in the drawings it will be seen that the bed of the press 22, is supported upon suitable legs 23, said bed also carrying spaced uprights 14 and 15. The cavity die member, which forms the bottom die in this invention, has a segmented article shaping surface, or cavity face, and comprises two segments 24 and 25 movable with respect to each other, segment 25 being firmly fixed to and supported upon the bed 22 of the press, with centrally mounted segment 24 adapted for limited vertical movement with respect to segment 25 as will be hereinafter explained in more detail. Four vertical side walls constituting the remainder of the article shaping surfaces or cavity faces in the form of case 26, which is essentially a metal rectangle with a central rectangular opening having smooth side walls, are adapted to snugly surround the entire segmented cavity die member, fitting slidably thereon to move up and down with respect thereto. Said four vertical side walls being unidirectional (vertical in this embodiment) and connected at their vertical edges to form a closed cavity with the cavity die member forming its bottom. Thus, a three dimensional, open cavity is supported on bed 22 for receiving the dry press material to be shaped. Following introduction of the dry press charge into said cavity, die plunger member 16 descends into said cavity to shape the charge in conformity with the internal contours of the cavity.

The case 26 is slidably attached to four (4) guide rods 27 which are positioned to ride in guide slideways provided in the cross head 13.

A two way air cylinder 28, firmly positioned in the bed 22, activated by two way valve 30, controlled by foot pedal 39, utilizing a constant source of air pressure not shown, regulates the vertical movement of the case 26. This is achieved in the following manner: two way air cylinder 28, has a centrally placed piston, which can be forced to an upper or lower extreme, over a predetermined range, by introducing air under pressure in either end of cylinder 28. For example, valve 30 is spring actuated to maintain foot pedal 39 in a raised position, permitting air pressure to enter air cylinder 28 in its lower chamber through air line 41 forcing said piston and its rod 40 to their uppermost position. Piston rod 40 is connected to yoke 38 by nut 42 for vertical movement in direct cooperation therewith of case 26 through connecting rods 29 suitably threaded and connected by nuts and lock washers at each end respectively to case 26 and yoke 38. Foot pressure applied to foot pedal 39 by an operator, releases the air pressure in the lower chamber of two way air cylinder 28, and diverts compressed air through line 43 to the upper chamber of two way air cylinder 28, forcing piston, its rod 40 and case 26, through its direct connection to yoke 38, downwardly to its lowermost position. Thus, an operator quickly and smoothly strips the side walls, in the form of case 26, of the forming cavity downwardly by simply depressing foot pedal 39. Releasing foot pressure on foot pedal 39 reverses air pressure in cylinder 28 and immediately returns case 26 to its uppermost position.

A second air cylinder (one way with internal pressure relief valve) 31, is in a like manner secured beneath the bed 22, with its threaded piston rod 32 screwed into the underside of cavity die member segment 24, piston rod 32 riding through suitable guide sleeves in segment 25 and bed 22. An air valve 44 fixed to the side of bed 22 in line with a source of compressed air not shown, permits compressed air to flow, when open, through line 45 to air cylinder 31 forcing piston rod 32 and segment 24 to their uppermost position. Cylinder 31 is equipped with a pressure relief valve which permits the escape of air in cylinder 31 under predetermined pressure. Thus, in practice, segment 24 is in its uppermost position when plunger die member 16 enters the forming cavity; the force of descending plunger die member 16 is transmitted through the material to be shaped, directly to segment 24, and to the piston of air cylinder 31 through piston rod 32, compressing the residual air in said cylinder to the critical point, thus releasing said pressure relief valve, allowing the escape of air therefrom, and permitting segment 24 to descend to its lowermost position under the impact, until adjustable stop nuts 34, in the bottom of segment 24, come to rest on their bearing surface 35 of segment 25 of the cavity die member. After the plunger die member has been withdrawn from the forming cavity, segment 24 may be returned to its uppermost position by the operator activating valve 44 as described above.

It would obviously be possible to replace the air cylinder 31 with a two way cylinder, and utilize air pressure to lower segment 24 prior to completion of the compaction stroke of the die plunger member 16, rather than relying on the transmitted impact of descending die plunger member 16 to perform this function. However, we have found utilization of descending plunger die member 16 to be preferred for this purpose.

Throughout the specification and claims, the term "cavity die member" will refer collectively to the die components surrounded by the case (when the plunger die member is withdrawn), and about which the case moves slidably, which components form the bottom die; in the preferred, illustrated embodiment, "cavity die member" would include both segments 24 and 25.

In describing generally the complete cycle of operation of our press then, with both the case 26, and the central segment 24 of the cavity die member, in their uppermost position, the open forming cavity thus formed is filled with dry press material 36 and struck flush with the upper flat surface of the case 26. Toggle arm 10 is pulled downwardly, plunger die member 16 descends forcefully into the forming cavity, is struck several additional blows as hereinbefore described, shaping a pressed article 37 within said forming cavity; then toggle arm 10 is pushed upwardly, withdrawing the plunger die member 16 from the cavity. The force of the plunger die member 16 having driven segment 24 to its lowest position as hereinbefore described. The operator then depresses foot pedal 39, stripping side walls in the form of case 26 downwardly out of contact with the shaped article. The operator then opens valve 44, energizing air cylinder 31 which elevates segment 24, said segment 24 thus pushing the shaped article 37 free of contact with stationary segment 25, permitting said operator to quickly and easily remove shaped article 37 from cavity die member segment 24, without endangering vertical flanges 47.

Now to illustrate in more detail the operation of our novel die and its advantages, reference will be made to FIGS. 3, 4, 5, and 6 which more graphically illustrate the details of the steps described above. In order to simplify the mechanics of the basic invention, only the critical features of the mechanism are shown, the motivating structure being omitted as having been adequately described supra.

FIG. 3 illustrates the first step in the operation, with the plunger die member 16 in its uppermost position, case 26 in its uppermost position, and the central segment 24, of the cavity die member, in its uppermost position with respect to the fixed segment 25 of the cavity die member. Dry press material 36 has been placed in the die cavity, and struck flush with the flat upper surface of the case 26, it being borne in mind that the case 26 is being held in its upper position by the two way air cylinder 28, and the cavity die member segment 24 is being held in its uppermost position by residual pressure in air cylinder 31. It will be noted that the web of the flanged article being shaped, in its uncompacted state, has a thickness Y, while the vertical dimension of the flange is X.

For a 3 dimensional view of the shaped article of this invention, see FIG. 7, wherein the shaped article is represented generally by the number 37, its web by 46 and its flanges, respectively, by numeral 47.

Figure 4:
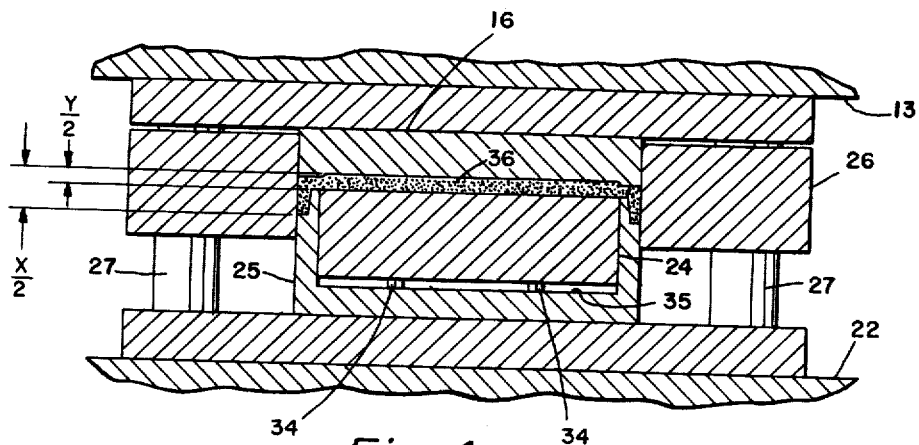
FIG. 4 is a sectional sequential view of the same parts depicted in FIG. 3, showing the plunger die member at the bottom of its stroke exerting maximum pressure on the material being pressed.

Referring now to FIG. 4 it will be seen that in the second shaping step the plunger die member 16 has descended into the forming cavity and has compacted the raw dry press material 36. Under the force of the blow, central segment 24 of the cavity die member has been forced to its lowermost position, determined by spacer bolts 34 coming in contact with surface 35 of segment 25, to a point where its upper surface is flush with the highest point of the shaping surface of the fixed segment 25 of the cavity die member. It should also be noted that all sections of the pressed, flanged piece have undergone essentially the same degree of compaction at this point. Refer briefly back to FIG. 3 and it will be seen that the thickness of the loose raw material through the web of the uncompacted article is dimension Y, while the vertical thickness through the flanges is dimension X. From FIG. 4 now, it will be seen that the flange has been compacted to a thickness of about $$\frac{X}{2}$$

and the web of the shaped article, has been compacted to a dimension equal to about $$\frac{Y}{2}$$

If all segments of the cavity die member were fixed in their respective positions as shown in FIG. 3 throughout the shaping operation, it can readily be seen that although web 46 would undergo a compression ratio of about 2:1, that of the flanges would only be on the order of 5:4. (Uncompacted thickness to compacted thickness.)

Herein lies one of the important points of novelty of our invention inasmuch as the raw material can be quickly and easily poured into the forming cavity, and quickly struck off even with the upper surface of the case 26 using a straight edge. In a completely fixed, nonsegmented cavity die member of the type used heretofore, sufficient compaction of the web of the finished piece using a relatively flat plunger die member would leave the flanges only partially compressed, weak, porous, with lamination pockets and an extremley short service life.

Figure 5:
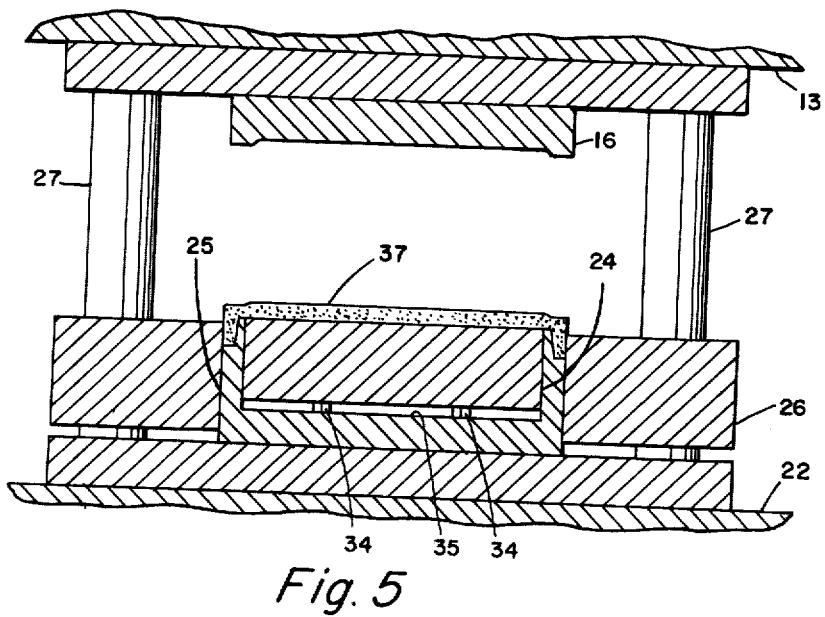
FIG. 5 is a sectional sequential view of the parts depicted in FIG. 3, showing the following phase of the pressing operation with the plunger die member in its upper-most position and the side walls (case) substantially stripped downwardly free of contact with the shaped article.

Referring to FIG. 5, it will be seen that in the following step the plunger die member 16 has been elevated out of the cavity, and the operator next having depressed pedal 39 as hereinbefore described, side walls of the forming cavity in the form of case 26 have been stripped downwardly to their lowermost position. However, from FIG. 5 in conjunction with FIG. 7, it will be readily seen that the flanged article still tightly embraces parts of both segments of the cavity die member, and breakage would likely result if it were necessary to pry said article loose from the cavity die member with the segments thereof in the juxtaposition depicted in FIG. 5.

In FIG. 6 then, the last phase of the operation is shown, with segment 24 having been elevated by activating air cylinder 31 as hereinbefore described. In its upward stroke, segment 24 has lifted the shaped article 37 evenly and smoothly out of all contact with all shaping surfaces, or faces, of the forming cavity, with the exception of segment 24.

Referring to FIG. 7 showing an exploded view of the segments 24 and 25 of the cavity die member, exaggerating the elevated position of segment 24 as shown in FIG. 6, it will be seen that the shaped article 37 may now be slidably removed from segment 24 in either direction shown. From FIG. 7 it can be readily seen that shaped article 37 could not be slidably removed from the cavity die member until its vertical flanges had been lifted clear of the undercut portion of segment 25 which formed the interior surfaces of said flanges. And when the forming cavity components are in the position shown in FIG. 5, any attempt to externally grip and lift shaped article 37 would tend to crumble both the web and flange thereof.

After shaped article 37 has been removed from elevated segment 24 as shown in FIG. 7, with the die components in their respective positions shown in FIG. 6, i.e., case 26 depressed, cavity die member 24 elevated, the operator releases foot pressure on pedal 39, forcing case 26 to its uppermost position as described supra, and all die components are in their respective positions as shown in FIG. 3, ready to receive another charge of raw material for repetition of the above described cycle.

After removal from the press, the shaped article 37 now has sufficient strength, due to its homogeneous compaction, to withstand rougher treatment during pre-firing handling, and after fired in a suitable kiln, the fired piece will have much greater strength and resistance to breakage in use than heretofore possible. Thus it can be readily seen that at least two salient features of novelty reside in our invention:

(I) Means for achieving uniform density in a pressure shaped article having variable cross section.

(II) Means for easily removing a pressure shaped article from a forming cavity without weakening or damaging said article.

While the press described in our preferred embodiment is of the friction wheel, screw type, the novel forming cavity features which are the basis of my invention, could be used with any type of dry press such as toggle, hydraulic, etc.

Furthermore, although the lower movable components of our invention, namely the side walls in the form of a case, and cavity die member segment 24, are activated by compressed air, we don't wish to limit ourselves to this means of activation, and obviously such movable die components could be activated by hydraulic pressure, lever and spring combinations, etc.

Although our preferred embodiment shows a cavity die member segment 24 which elevates to push a flanged, shaped article 37 free of another segment 25, it is to be understood that the same result could be achieved by depressing the flange forming segment 25, with respect to a stationary central segment 24, leaving the flanged shaped article 37 supported solely by segment 24, in an elevated position with respect to depressed segment 25. Further, if the article to be shaped had a single flange, centrally located such as resembles a T in cross section, this invention contemplates that the cavity die member segments under each horizontal crossbar of the T would be movable to depress, under the impact of plunger die member 16, with respect to the center segment directly beneath the vertical flange of said T, said movable segments being elevated following compression to facilitate easy removal of the shaped article from the press, and for achieving uniform pressure and resultant density in the vertical flange of the T, comparable to that achieved in its crossbars, substantially as set forth in the specification above, by depressing said movable segments during or before final compaction, but following introduction of the raw material charge to be shaped.

Or, the center segment in the above mentioned T embodiment could be depressed with respect to the segments supporting the cross bars of said T, during raw material introduction into the cavity, and be elevated just before or during the compaction operation, but following introduction of the raw material charge to be shaped, as described above, in order to equalize the degree of compaction throughout all vertical sections of the T shape.

Thus, the crux of our invention lies in the movement of one segment of a cavity die member, with respect to another segment of said cavity die member, in one direction, preceding or during compaction of the article to be shaped, and a movement of said first mentioned segment in an opposite direction, with respect to said other segment, said second movement following the steps of (1) compaction of the article, (2) removal of the plunger die member from the forming cavity, and (3) removal of the forming cavity side walls in the form of a case from substantial contact with the shaped article.

While the preferred embodiment involves a relatively flat section of a tile setter, with flanges at either end, the principles of our invention would obviously apply to any shape of variable cross section which lends itself to formation by the dry press process. Instead of being of generally rectangular shape, the web of the pressed piece could obviously be triangular, circular, trapezoidal, etc. And, while we have disclosed only one movable segment of the cavity die member, our invention contemplates that, depending upon the complexity of the article to be shaped, any number of movable segments of said cavity die member could be employed for the purpose of equalizing compression ratios within the pressed piece, and for facilitating its removal from the press after it has been shaped.

Having thus described our invention, we claim:

1. In an apparatus for pressure forming a shaped article from pressure shapable material, said apparatus having a fixed bed upon which are supported connecting side walls extending generally in the same direction, said side walls surrounding a cavity die member conforming to the shape of the area circumscribed by aforementioned connecting side walls, to form a cavity, said cavity adapted to receive a charge of pressure shapable material, a plunger die member movable into said cavity in substantially a single continuous compacting stroke in a direction generally parallel to the planes of aforementioned side walls, and opposed to said cavity die member, said plunger die member having an outline, taken in a plane generally normal to the common direction of said side walls, coincident with the outline of the area circumscribed by aforementioned connecting side walls, reciprocating means for moving said plunger die member in its compacting stroke into said cavity to shape said pressure shapable material introduced therein to an outline conforming to the outline of said cavity, and out of said cavity following said compacting stroke, the improvement, in combination therewith, of a segmented cavity die member, said segments constituting the shaping surface of said cavity die member, at least one of said segments immovable, operationally, with respect to a fixed point, at least one of said segments movable with respect to said fixed segment in a direction generally parallel to the common direction of aforementioned connecting side walls, said movable segment having an upper and lower limit of movement within said cavity, a first means for maintaining said movable segment at its upper limit during the filling operation of said cavity, a second means for moving said movable segment sequentially to its lower limit following completion of the cavity filling operation but prior to completion of the compacting stroke of said plunger die member, said first means coacting sequentially with said movable segment to return same back to its upper limit following completion of said compacting stroke, which return of said segment back to its upper limit pushes said shaped article, while in supported contact with said movable segment, free of said other immovable segment of said die cavity member, to produce a shaped article of homogeneous density which is readily removable from contact with said cavity die member segments.

2. The apparatus of claim 1 wherein said second means for moving said movable segment sequentially to its lower limit is the die plunger member.

3. The apparatus of claim 1 wherein said side walls are slidably movable with respect to said cavity die member and a third means coacts with said side walls to lower them from their position maintained during compaction and removal of said plunger die member from said forming cavity.

4. The apparatus of claim 1 wherein said first means is a compressed air cylinder which coacts yieldably with said movable segment and said descending plunger die member to permit said movable segment to travel to the lower extreme of its stroke, responsive to the downward movement of said plunger die member following the operation of filling said forming cavity.

5. In an apparatus for pressure forming a shaped article from pressure shapable material, said apparatus having a fixed bed upon which are supported connecting side walls extending generally in the same direction, said side walls surrounding a cavity die member conforming to the shape of the area circumscribed by aforementioned connecting side walls, to form a cavity, said cavity adapted to receive a change of pressure shapable material, a plunger die member movable into said cavity in a compacting stroke in a direction generally parallel to the planes of aforementioned side walls, and opposed to said cavity die member, said plunger die member having an outline, taken in a plane generally normal to the common direction of said side walls, coincident with the outline of the area circumscribed by aforementioned connecting side walls, reciprocating means for moving said plunger die member in its compacting stroke into said cavity to shape and said pressure shapable material introduced therein to an outline conforming to the outline of said cavity, and out of said cavity following said compacting stroke, the improvement, in combination therewith, of a segmented cavity die member, said segments constituting the shaping surface of said cavity die member, at least one of said segments immovable, operationally, with respect to a fixed point, at least one of said segments movable with respect to said fixed segment in a direction generally parallel to the common direction of aforementioned connecting side walls, said movable segment having an upper and lower limit of movement within said cavity, a first means for maintaining said movable segment at its upper limit during the filling operation of said cavity, said movable segment movable to its lower limit responsive to the downward movement of said plunger die member in its compaction stroke, said first means coacting sequentially with said movable segment to return same back to its upper limit following completion of said compacting stroke, which return of said segment back to its upper limit pushes said shaped article, while in supported contact with said movable segment, free of said other immovable segment of said die cavity member, to produce a shaped article of homogeneous density which is readily removable from contact with said cavity die member segments.

References Cited in the file of this patent

UNITED STATES PATENTS

| | | |
|---|---|---|
| 1,503,619 | Zeh | Aug. 5, 1924 |
| 1,648,721 | Claus | Nov. 8, 1927 |
| 2,325,687 | Kux | Aug. 3, 1943 |
| 2,499,980 | Stokes et al. | Mar. 7, 1950 |
| 2,608,826 | Haller | Sept. 2, 1952 |
| 2,810,929 | Willi | Oct. 29, 1957 |
| 2,821,748 | Willi | Feb. 4, 1958 |
| 2,831,212 | Belden | Apr. 22, 1958 |
| 2,883,703 | Frank | Apr. 28, 1959 |
| 3,036,355 | Mays et al. | May 29, 1962 |
| 3,044,138 | Lesnett et al. | July 17, 1962 |

OTHER REFERENCES

Pearl: "Effective Mold Design," Modern Plastics, April 1958, pp. 111–115.

UNITED STATES PATENT OFFICE
CERTIFICATE OF CORRECTION

Patent No. 3,097,411                                July 16, 1963

Charles W. Gerster et al.

It is hereby certified that error appears in the above numbered patent requiring correction and that the said Letters Patent should read as corrected below.

Column 1, line 33, for "radio" read -- ratio --; column 8, line 74, for "change" read -- charge --; column 9, line 9, strike out 'and".

Signed and sealed this 31st day of March 1964.

(SEAL)
Attest:
ERNEST W. SWIDER                                EDWARD J. BRENNER Attesting Officer                                      Commissioner of Patents